(12) United States Patent
Bellis, Jr.

(10) Patent No.: US 6,874,309 B1
(45) Date of Patent: Apr. 5, 2005

(54) DISCHARGE BAFFLE FOR LAWNMOWER

(76) Inventor: William B. Bellis, Jr., 1401 Schuff La., Louisville, KY (US) 40205

( * ) Notice: Subject to any disclaimer, the term of this patent is extended or adjusted under 35 U.S.C. 154(b) by 0 days.

(21) Appl. No.: 10/680,520

(22) Filed: Oct. 7, 2003

Related U.S. Application Data

(63) Continuation-in-part of application No. 10/366,308, filed on Feb. 13, 2003.
(60) Provisional application No. 60/370,093, filed on Apr. 4, 2002.

(51) Int. Cl.$^7$ .............................................. A01D 75/20
(52) U.S. Cl. ...................................... 56/320.2
(58) Field of Search ............................... 56/17.5, 16.9, 56/320.1, 320.2

(56) References Cited

U.S. PATENT DOCUMENTS

| | | |
|---|---|---|
| 2,578,880 A | 12/1951 | Doyle |
| 2,857,727 A | 10/1958 | Cole |
| 3,234,719 A | 2/1966 | Rank |
| 3,404,519 A | 10/1968 | Demers |
| 3,696,595 A | 10/1972 | Dahl |
| 3,925,972 A | 12/1975 | Andersson |
| 4,135,351 A | 1/1979 | Akgulian |
| 4,189,904 A * | 2/1980 | Paker ........................ 56/255 |
| 4,226,074 A | 10/1980 | Mullet et al. |
| 4,445,312 A | 5/1984 | Cartner |
| 4,864,808 A * | 9/1989 | Weber ...................... 56/320.2 |
| 5,040,364 A | 8/1991 | Deegan |
| 5,048,279 A | 9/1991 | Badawey et al. |
| 5,133,175 A | 7/1992 | Dumbrell |
| 5,205,112 A | 4/1993 | Tillotson et al. |
| 5,284,007 A | 2/1994 | Poe et al. |
| 5,442,902 A * | 8/1995 | Mosley et al. ............... 56/17.5 |
| 5,465,564 A | 11/1995 | Koehn et al. |
| 5,628,171 A | 5/1997 | Stewart et al. |
| 5,657,620 A | 8/1997 | Thagard et al. |
| 5,826,417 A | 10/1998 | Evans |
| 5,845,475 A | 12/1998 | Busboom et al. |
| 5,987,863 A * | 11/1999 | Busboom et al. .......... 56/320.1 |
| 6,006,506 A | 12/1999 | Dawson |
| 6,192,666 B1 | 2/2001 | Sugden et al. |
| 6,609,358 B1 | 8/2003 | Schmidt et al. |
| 2003/0217540 A1 | 11/2003 | Osborne |
| 2003/0217541 A1 | 11/2003 | Osborne |
| 2003/0217542 A1 | 11/2003 | Osborne |
| 2003/0221405 A1 | 12/2003 | Hartley |

OTHER PUBLICATIONS

W. E. Chapps, web site—www.wechapps.com Mar. 10, 2003.
York Sheet Metal, web site—www.yorksheet.com Mar. 17, 2003.
Dixie Chopper, web site—www.teamdixiechopper.com Mar. 17, 2003.
W. E. Chapps web site—www.wechapps.com Mar. 17, 2003.

* cited by examiner

Primary Examiner—Robert E. Pezzuto
(74) Attorney, Agent, or Firm—Camoriano and Associates; Theresa Fritz Camoriano; Guillermo Camoriano

(57) ABSTRACT

A discharge baffle for a lawnmower may be operated to open or close the discharge opening of the lawnmower without interfering with the operation of the discharge shroud of the lawnmower.

33 Claims, 19 Drawing Sheets

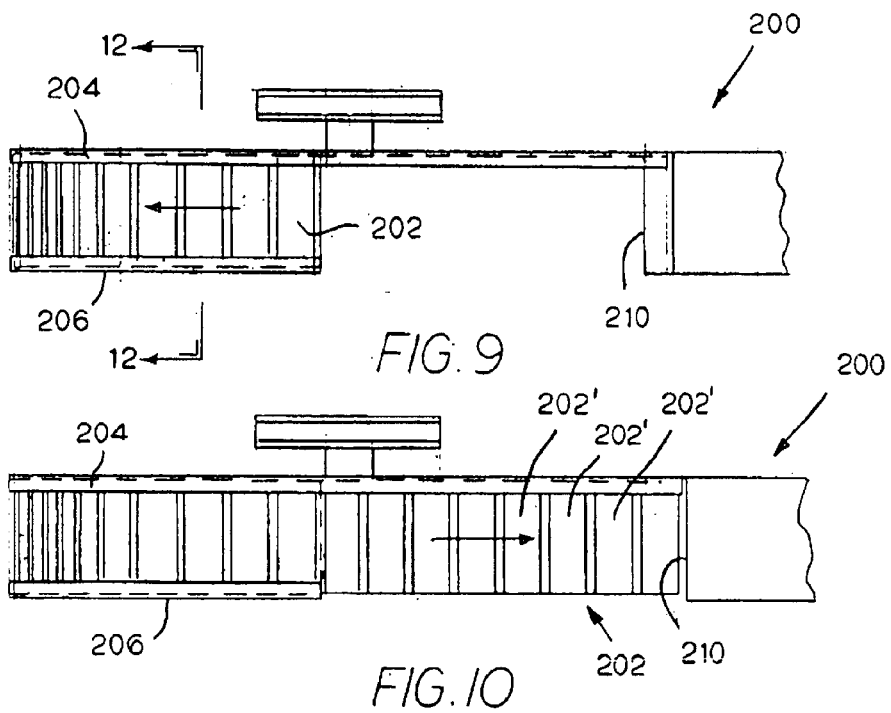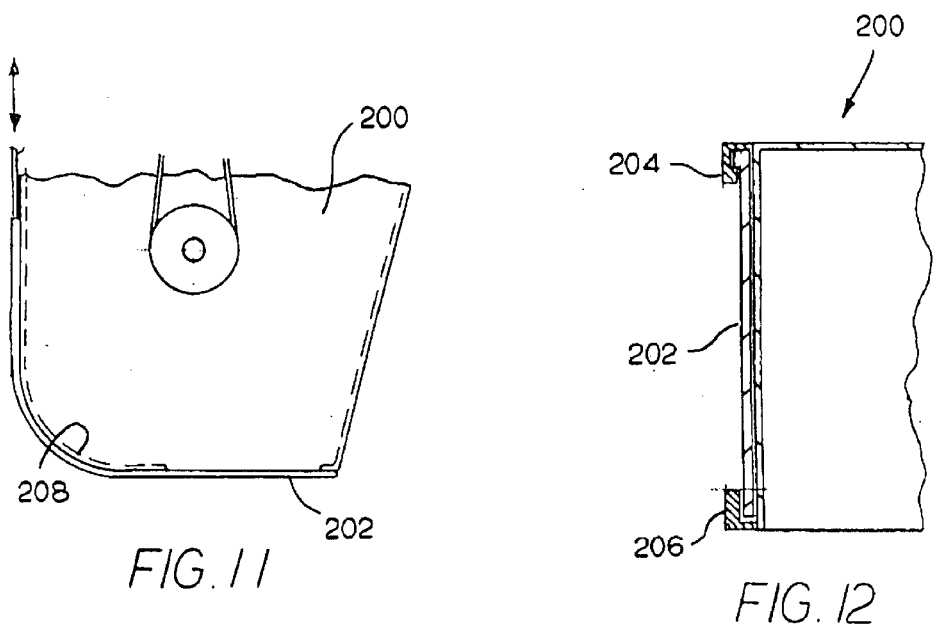

DISCHARGE BAFFLE FOR LAWNMOWER

This is a continuation-in-part of U.S. application Ser. No. 10/366,308, filed Feb. 13, 2003, which claims priority from U.S. Provisional Application Ser. No. 60/370,093, filed Apr. 4, 2002, both of which are hereby incorporated by reference.

BACKGROUND

The present invention relates to lawnmowers, and, in particular, to a discharge baffle for a lawnmower which can be opened and closed by the user. The baffle may be used to close the discharge opening of the mower for mulching or simply to close the discharge opening when mowing past sidewalks or flower beds in order to prevent grass clippings from covering those areas, and then the baffle may be opened again to permit the grass to exit normally for the rest of the time.

Prior art baffles cannot be used in conjunction with the existing discharge shroud on lawnmowers. In order to use them, the user must remove or disable the discharge shroud, thus losing the protection offered by the discharge shroud.

SUMMARY OF THE INVENTION

The present invention provides a discharge baffle which can be used while the regular discharge shroud is in place and functioning. This baffle may be installed as original equipment on new lawnmowers or may be sold as a retrofit kit to accommodate a large variety of existing lawnmowers, including walk-behind mowers and riding mowers. The installation of the retrofit kit is straightforward and customizable so that the same kit can be used for many brands of mowers.

BRIEF DESCRIPTION OF THE DRAWINGS

FIG. 9 is a broken away view of another embodiment of a discharge baffle assembly made in accordance with the present invention, with the discharge baffle in the open position;

FIG. 10 is the same view as FIG. 9, but with the discharge baffle assembly in the closed position;

FIG. 11 is a broken away plan view of the mower deck and discharge baffle assembly of FIGS. 9 and 10;

FIG. 12 is a view taken along line 12—12 of FIG. 9;

DESCRIPTION OF THE PREFERRED EMBODIMENTS

Figure 1:
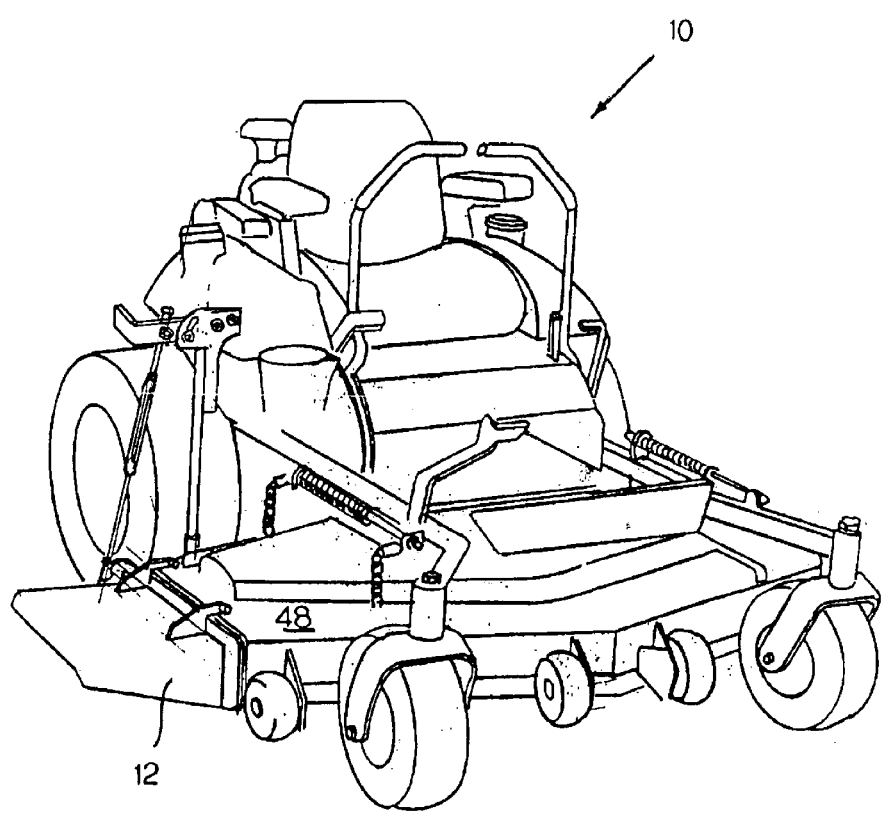
FIG. 1 is a perspective view of a riding lawnmower including a discharge baffle made in accordance with the present invention.
Figure 2:
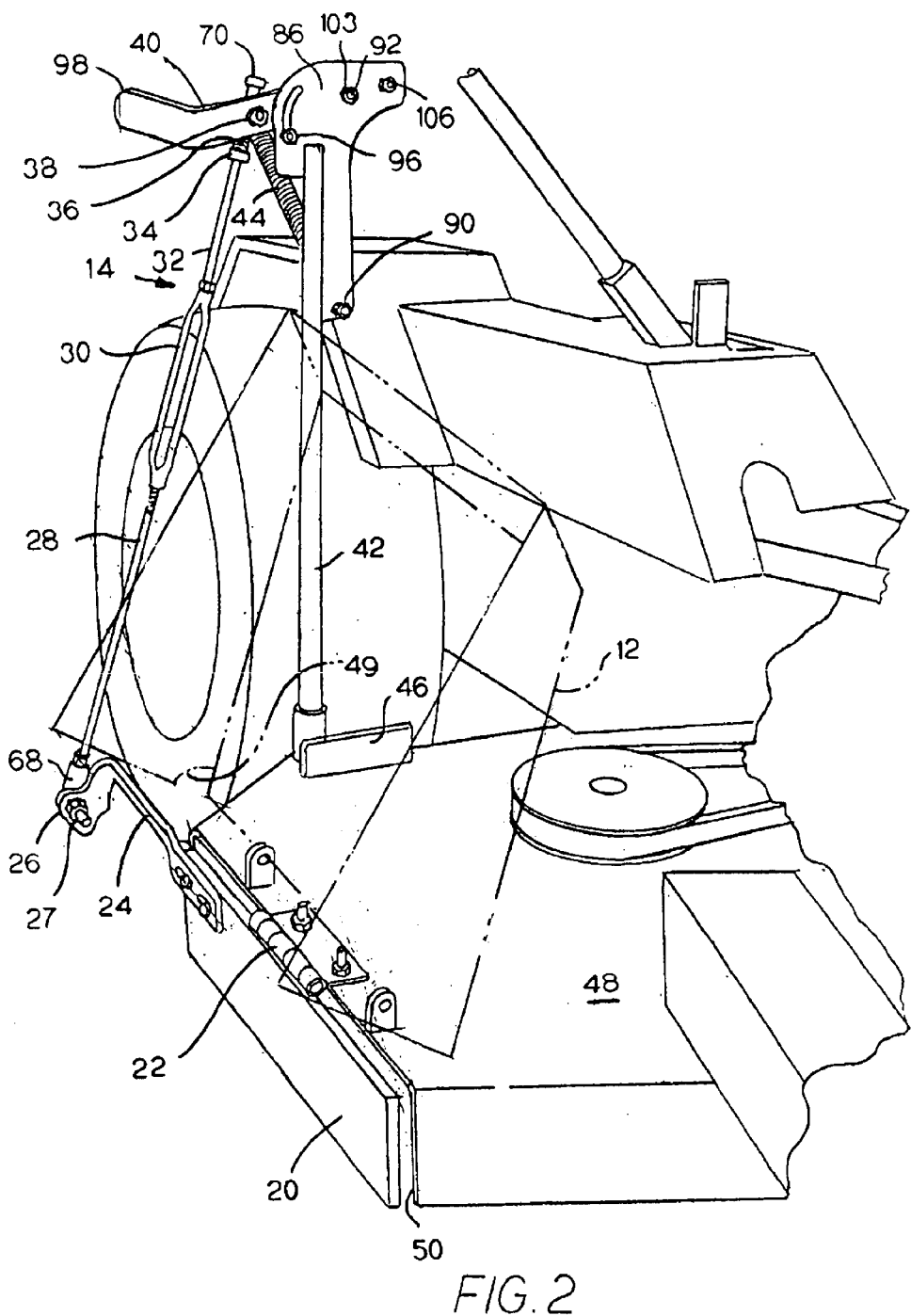
FIG. 2 is a broken away view of the discharge opening portion of the lawn mower of FIG. 1, with the discharge shroud shown in phantom in the fully raised position.

FIGS. 1–5 show various views of a riding lawnmower 10, including a discharge shroud 12, with a discharge baffle assembly 14 made in accordance with the present invention. FIG. 2 shows a broken away view of the lawnmower of FIG. 1, with the discharge shroud 12 shown in phantom in the fully raised position and with the discharge baffle in the closed or lowered position.

Figure 5:
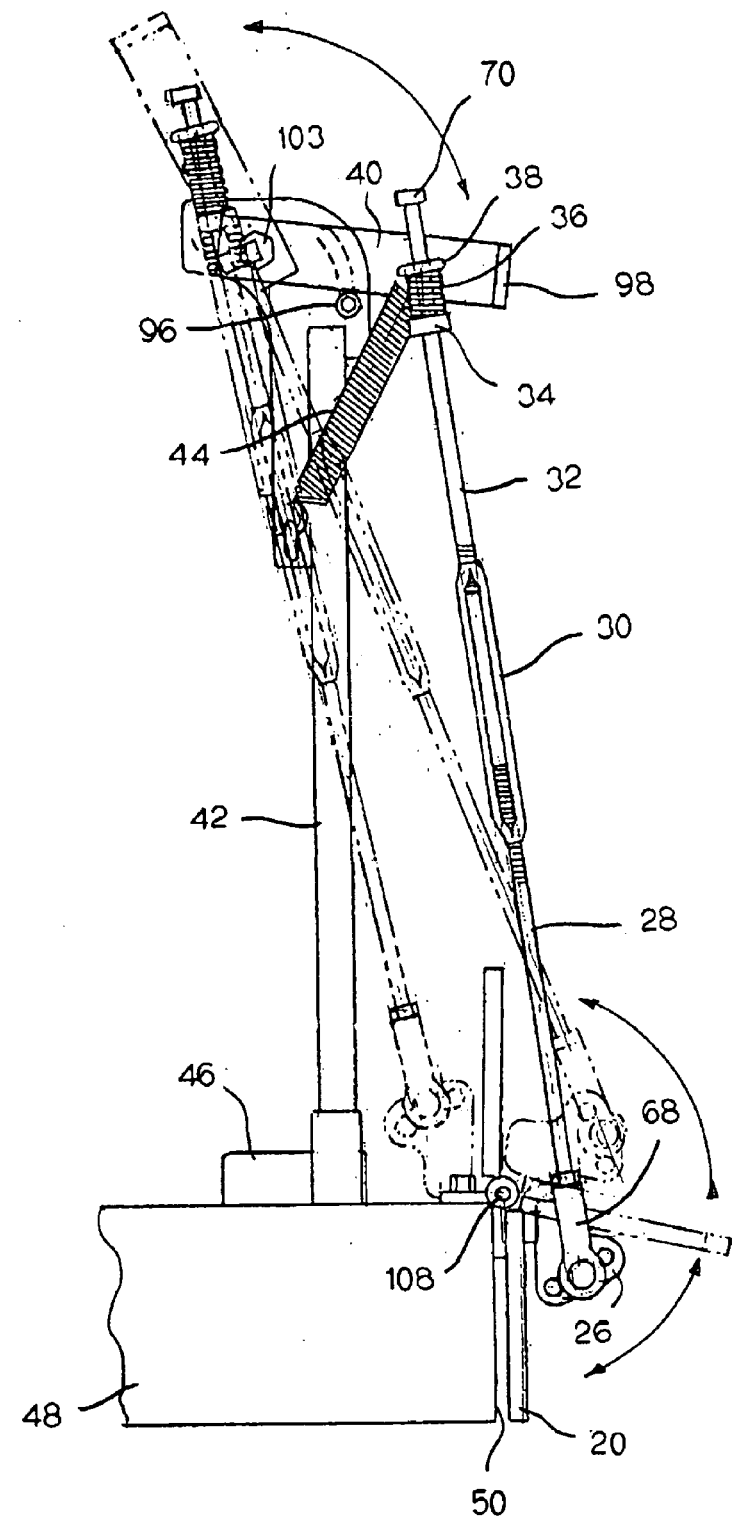
FIG. 5 is a broken away end view, from the same viewpoint as that of FIG. 3A, but with the discharge shroud removed for clarity and showing the entire discharge baffle assembly, with the baffle shown in the fully lowered position and, in phantom, showing the open and fully raised positions.
Figure 5A:
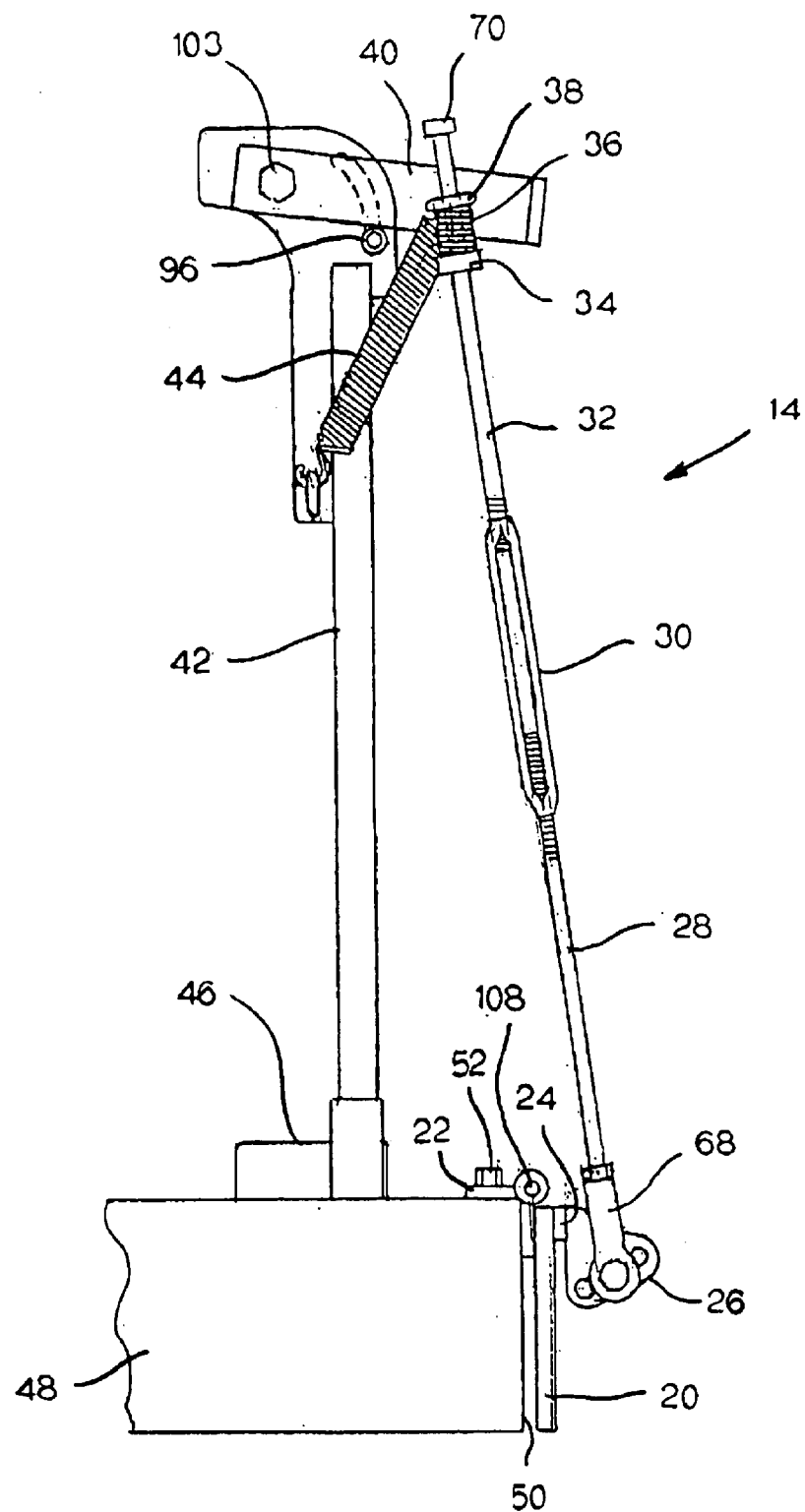
FIG. 5A is the same view as in FIG. 5, showing the baffle in the fully lowered position.

As shown best in FIG. 5A, the discharge baffle assembly 14 includes a baffle plate 20, a hinge 22, an actuator arm 24, a lower linkage shaft 28, a turnbuckle 30, an upper linkage shaft 32, a locking collar 34 with a set screw, a compression spring 36, an eye bolt connector 38, a handle lever 40, a vertical upright support 42, an extension spring 44, and a mower deck bracket 46 mounted to the mower deck 48. The actuator arm 24 includes a cam action mounting mechanism 26 to adjustably secure the actuator arm 24 to the lower linkage shaft 28.

Figure 3:
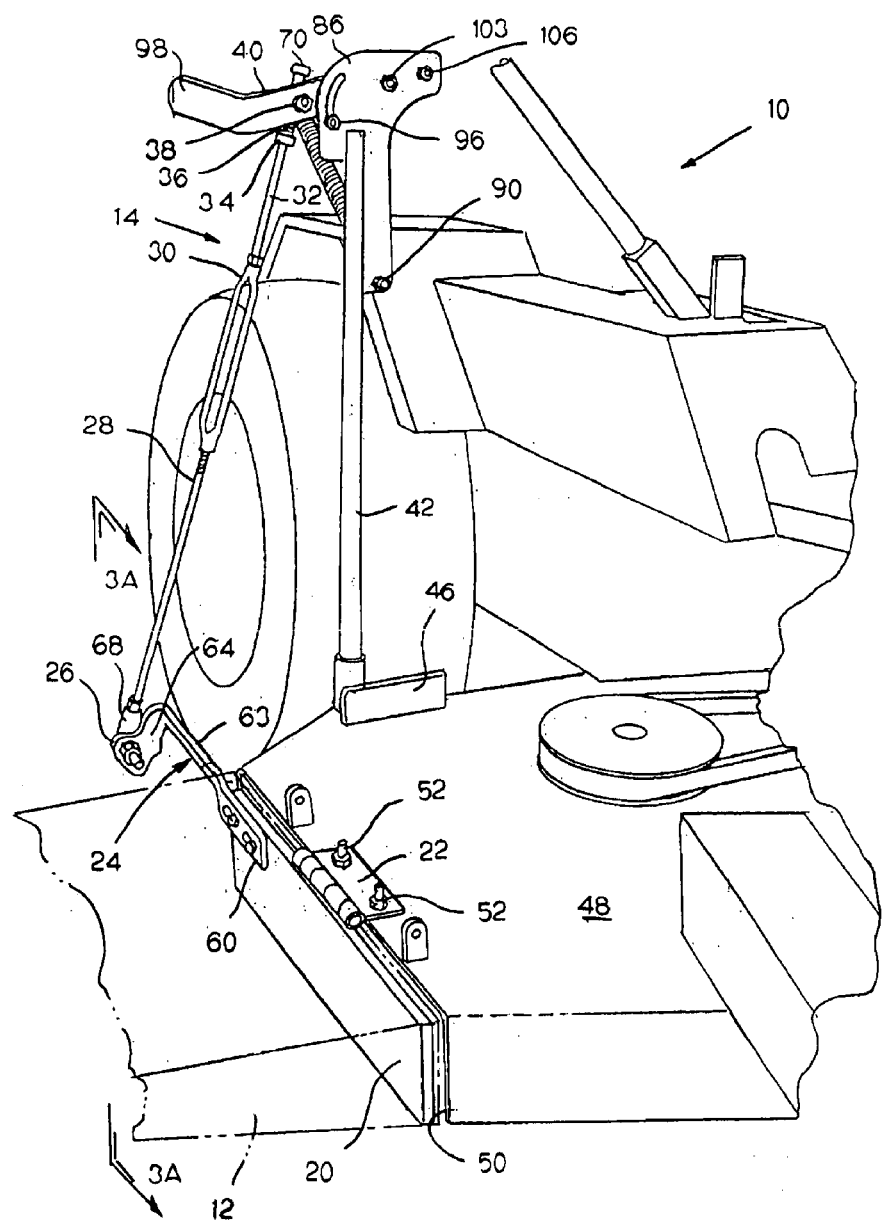
FIG. 3 is the same view as in FIG. 2, but with the discharge shroud shown in phantom in the fully lowered position.
Figure 6:
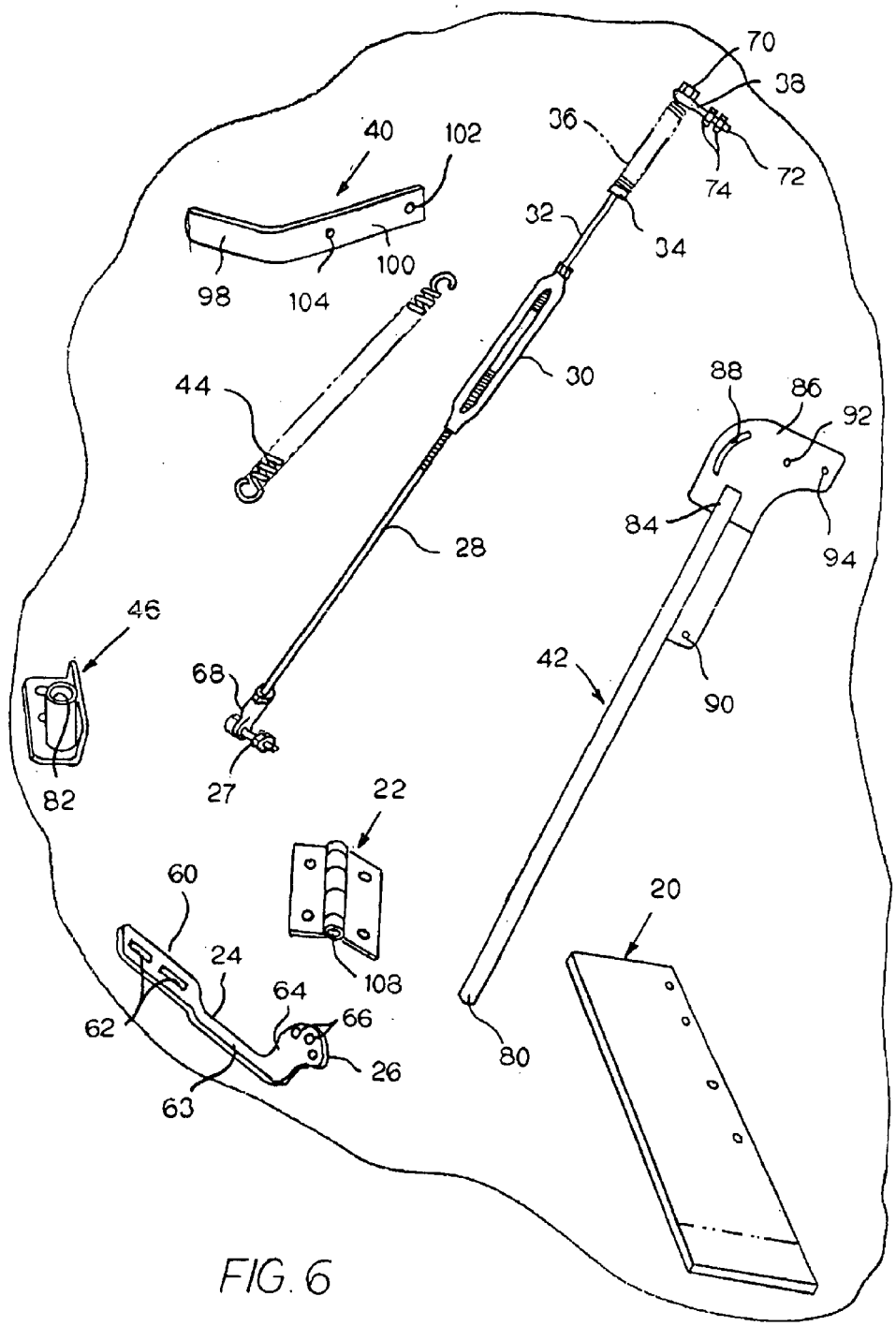
FIG. 6 is an exploded perspective view of the main components of a retrofit kit for the baffle shown in the preceding figures.

Referring now to FIG. 6, the baffle plate 20 is preferably a flat piece of sturdy material which can be readily cut to fit the size of the lawnmower's discharge opening by using a hand saw. A thick piece of plastic is preferred, though the baffle plate 20 could be made from various materials. For example, it may be made of metal, such as a stainless steel or aluminum sheet, or it may be molded, stamped, or forged to match a specific size discharge opening 50 on the mower deck 48. If supplied in a kit as shown in FIG. 6, the user cuts the baffle plate 20 to size, as shown in FIG. 3, to cover the discharge opening 50 in the mower deck 48. The baffle plate 20 is then secured to the hinge 22, which is secured to the mower deck 48, as by bolts 52, so that the baffle plate 20 may pivot about the hinge 22 to a closed position, an open position, and a fully raised position. The mechanism for controlling the positions of the baffle plate 20 will be described later.

Figure 3A:
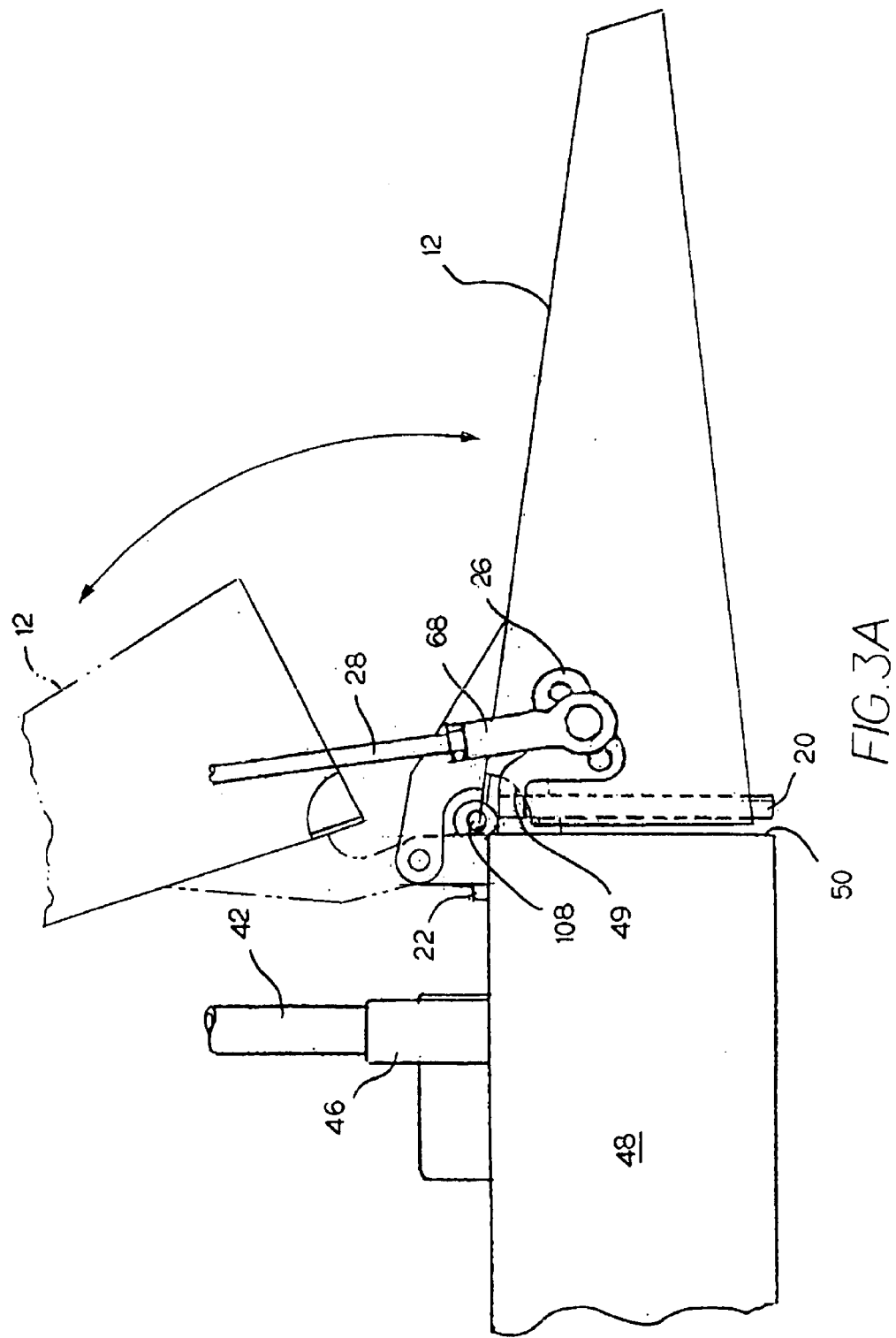
FIG. 3A is a broken away end view along line 3A—3A of FIG. 3, showing the discharge baffle and the shroud in the fully lowered position and, in phantom, showing the shroud in the fully raised position.

When in the closed or lowered position, the baffle plate 20 is in a substantially vertical orientation and substantially covers the mower discharge opening 50 to keep grass clippings and other debris from being expelled from the mower deck via the discharge opening 50 (See FIGS. 3 and 3A). The baffle plate 20 is installed underneath the discharge shroud 12 and does not interfere with the function of the discharge shroud 12.

Figure 3B:
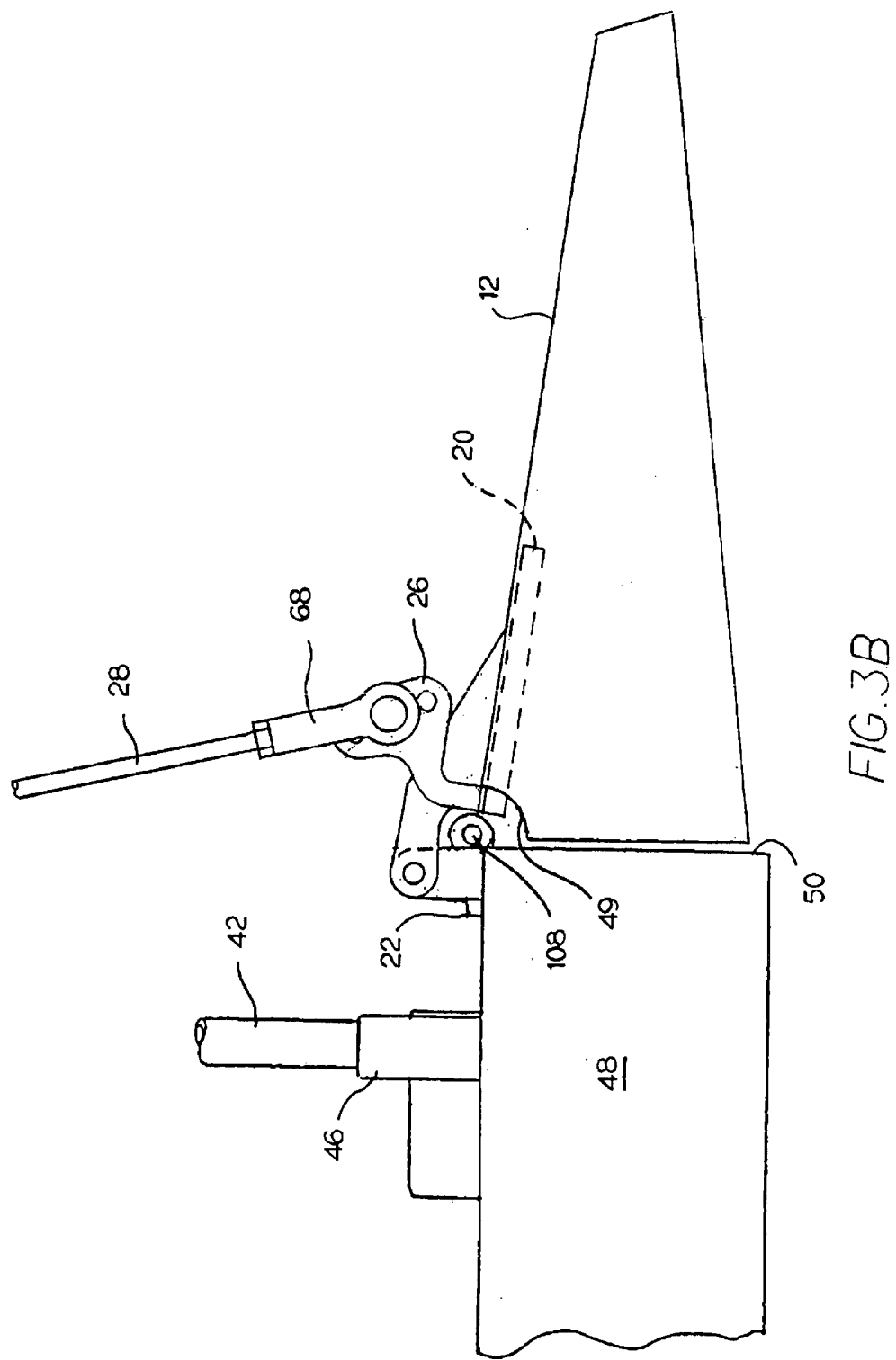
FIG. 3B is the same view as in FIG. 3A except it shows the discharge baffle in the open position.

When in the open position, the baffle plate 20 is in a substantially horizontal orientation (as seen in FIG. 3B), hugging the underside of the discharge shroud 12 so that grass clippings and other debris may be expelled from under the mower deck 48. It is also possible to provide an additional position on the control mechanism or an additional control mechanism so that opening the baffle plate 20 also raises the discharge shroud 12.

Figure 5B:
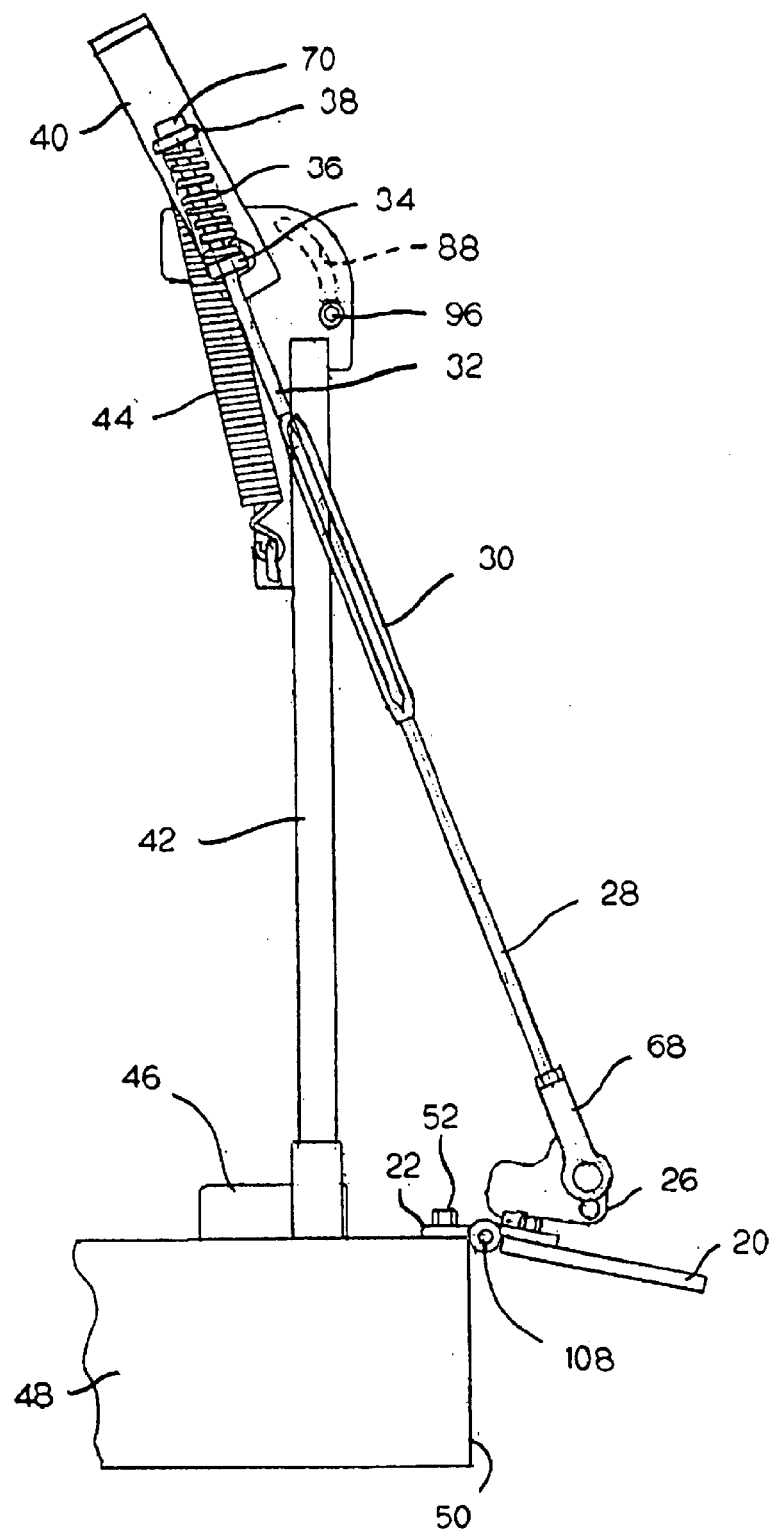
FIG. 5B is the same view as in FIG. 5A, but showing the baffle in the open position.
Figure 5C:
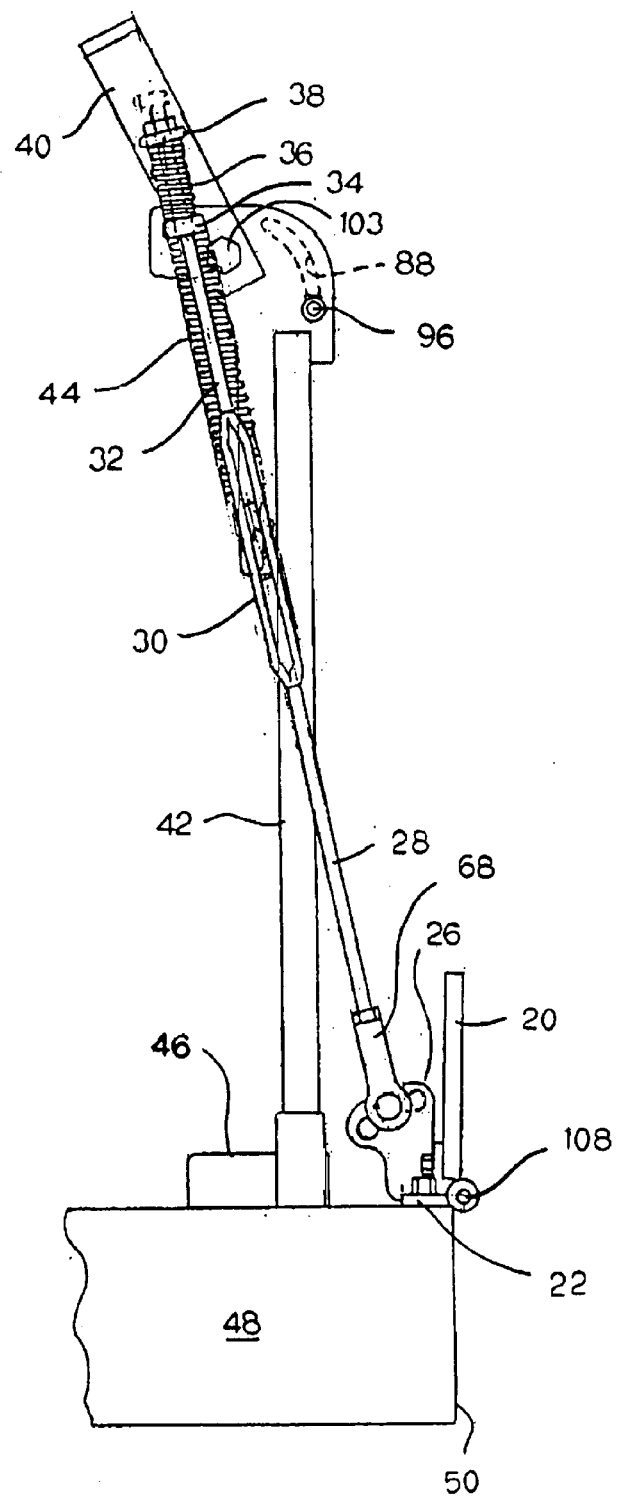
FIG. 5C is the same view as in FIG. 5B, but showing the baffle in the fully raised position for transport.

For transportation, it may be desirable to raise the discharge shroud 12 (as shown in phantom in FIGS. 2 and 3A) and to move the baffle plate 20 to a fully raised position (as shown in FIG. 5C), wherein the entire discharge baffle assembly 14 does not extend beyond the end of the mower deck 48. Naturally, for the baffle plate 20 to be able to reach this fully raised position, the discharge shroud 12 must also be in the fully raised position (as shown in phantom in FIGS. 2 and 3A). The footprint of the mower deck (defined as the planar projection of the mower deck onto the ground), with or without the discharge baffle assembly, remains the same when the discharge baffle assembly is in the fully raised position (See FIG. 5C).

A significant feature of the discharge baffle assembly 14 is that it may be placed in the open position and in the fully lowered (closed) position and may be moved to any position between those two positions without interfering with the operation of the discharge shroud 12. The discharge baffle assembly 14 also may be moved from the fully lowered (closed) position to the open position without having to stop the lawnmower 10, without having to stoop to where the baffle plate 20 is located, and without having to place fingers or hands near where the blades of the mower deck 48 are operating. Typically, the user of the present invention may operate the baffle plate 20 from the comfort and safety of his seated or walking position while the lawnmower 10 is in full operation.

Figure 4:
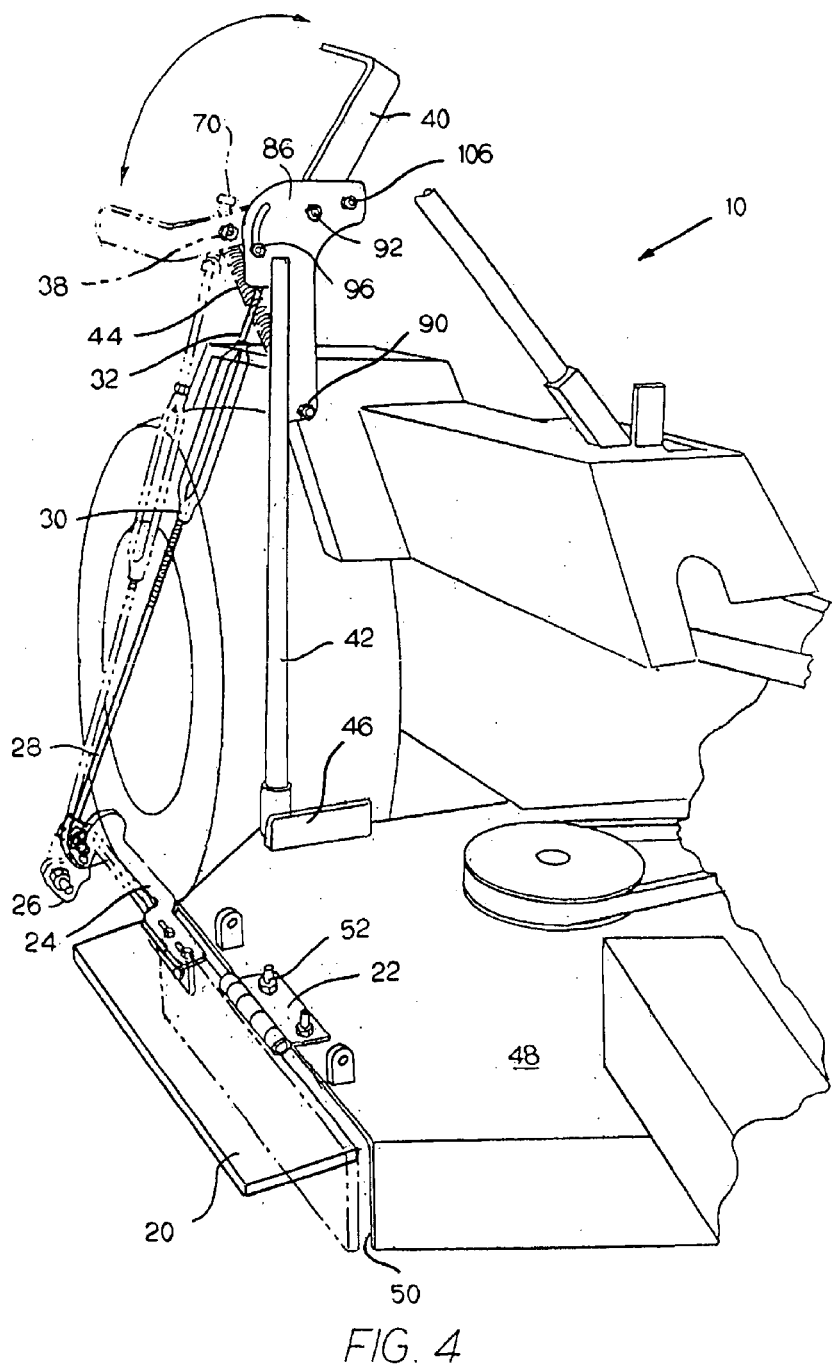
FIG. 4 is the same view as in FIG. 3, but with the discharge shroud removed for clarity and with the baffle in the open position and, in phantom, in the fully lowered position.

Referring to FIGS. 4, 5A, and 6, the mechanism for controlling the operation of the baffle plate 20 includes an actuator arm 24, having a first end 60, with slotted openings 62 used for adjustably securing the actuator arm 24 to the baffle plate 20, and a second end 64 which terminates in the cam mounting mechanism 26 oriented at a substantially right angle to the main axis of the actuator arm 24, and which includes a plurality of openings 66 for adjustably securing the lower linkage shaft 28 to the cam 26 via a ball joint connection 68. The ball joint connection 68 permits pivoting of the elements relative to each other while accommodating some misalignment. Between the first end 60 of the actuator arm 24, which connects to the baffle plate 20, and the second end 64, which connects to the control linkage, is an extension portion 63, which has a narrow profile and which is offset from and at a slightly higher elevation than the first end 60, so that it requires only a very small cutout from the shroud 12 in order to extend through the shroud 12 to operate the baffle plate 20. The ball joint connection 68 is secured to one of the openings 66 in the cam mounting mechanism 26, with the selection of which opening 66 to use dependent on the amount of leverage required to open and close the baffle plate 20.

The lower linkage shaft 28 is threaded on both ends, with a first end threading into the ball joint connection 68 and the second end threading into one end of the turnbuckle 30. The upper linkage shaft 32 is threaded at a first end which is connected to the turnbuckle 30 and has a hexagonal head 70 at its second end. To assemble the upper linkage 32 to the turnbuckle 30, the first end is first inserted through the eye of the upper ball joint 38; then it is inserted through the compression spring 36; and finally it is inserted inside the locking collar 34 before being threaded to the turnbuckle 30. The upper ball joint 38 includes a threaded shaft 72 and two self-locking nuts 74 used to mount the upper ball joint 38 to the handle 40 as explained later. The compression spring 36 is effectively trapped in compression between the locking collar 34 and the upper ball joint 38. The locking collar 34 is adjustably secured to the upper linkage shaft 32 via a set screw (not shown), and the upper ball joint 38 is preferably mounted to the handle 40 via the self-locking nuts 74 in such a manner as to allow the upper ball joint 38 to pivot about the axis defined by the shaft 72. The compression spring 36 pushes against the locking collar 34 and against the upper ball joint 38, thus pushing the upper linkage shaft 32 downwardly. The purpose of the compression spring 36 is to hold the linkage in the fully open position as shown in FIG. 5C.

The vertical upright 42 has a first end 80 (See FIG. 6) which slides into a mating receptacle 82 in the deck mounting bracket 46 to hold the vertical upright 42 in a substantially vertical orientation. The deck mounting bracket 46 is attached to the mower deck 48 (See FIGS. 3 and 3A) by some known means, such as bolting or welding. The vertical upright 42 is of sufficient length to provide a convenient mounting surface for the handle 40 at a height which is readily accessible to the user while seated on the riding mower 10. The second end 84 of the vertical upright 42 includes a flat plate 86 which defines an arcuate slotted opening 88. The flat plate 86 also defines a tension spring anchor point 90, a handle pivot point 92, and a handle upper limit stop 94. A bolt 96 (See FIGS. 5–5C) is adjustably secured at a fixed position in the arcuate slotted opening 88 to provide a lower limit stop for the handle 40.

The handle 40 (See FIG. 6) has an offset arm 98 and a leg 100 which defines a handle pivot hole 102 and an upper linkage pivot hole 104. The handle 40 is pivotably mounted to the plate 86 of the vertical upright 42 at the handle pivot hole 102 by means of a bolt 103. The shaft 72 of the upper ball joint 38 is pivotably mounted through the linkage pivot hole 104 of the handle 40. A bolt 106 (See FIG. 2) is mounted at the handle upper limit stop 94 to provide a stop which contacts the leg 100 of the handle 40 to stop rotation of the handle 40 about the handle pivot axis (defined by the handle pivot point 92) when the baffle plate 20 is in the fully raised position as shown in FIG. 5C. A tension spring 44 is mounted to the discharge baffle assembly 14 by hooking up the first end of the spring 44 to the tension spring anchor point 90 on the flat plate 86 of the vertical upright 42 and the second end of the spring 44 to the shaft 72 of the upper ball joint 38, leaving the spring 44 in tension at all times during operation.

The spring 44 is mounted "over center" such that, when the handle is in a first position corresponding to when the baffle plate is in the fully closed position (See FIG. 5A), the spring 44 is pulling down on the handle 40 on a first side of the vertical upright 42; and when the handle is in a second position corresponding to when the baffle plate is in the open position (See FIG. 5B) or in the fully raised position (See FIG. 5C), the spring 44 is pulling down on the handle 40 on a second side of the vertical upright 42. In either case, the spring 44 "locks" the handle 40 in place until the spring force is overcome by the operator as he repositions the handle 40.

Assembly: In order to install the discharge baffle assembly on the mower for the first time, the safety shroud 12 is removed from the lawnmower 10 and set aside. The baffle plate 20 is brought up to the discharge opening 50 and is marked and cut to size to fit over and to substantially close off the discharge opening 50. The hinge 22 is mounted to the plate 20 (preferably via bolts) and to the mower deck 48 (again, preferably via bolts 52), such that the plate 20 substantially closes off the discharge opening 50 when the plate 20 is pivoted to the fully closed position shown in FIG. 5A. The actuator arm 24 is attached to the plate 20, preferably using bolts through the slotted openings 62, such that the cam mounting mechanism 26 projects off to the side of the mower deck 48 and toward the rear of the lawnmower 10 as shown in FIG. 3. At this point, the shroud 12 may be reinstalled on the mower deck 48. A small notch 49 is cut on the side of the shroud 12 (see FIG. 3B) to provide a passageway for the actuator arm 24 to exit from under the safety shroud 12.

The mower deck bracket 46 is mounted onto the top of the mower deck 48 at a point toward the rear of the mower deck 48 so that the handle 40, once mounted to the vertical upright 42, will be readily reachable by the user seated on the lawnmower 10. The handle 40 is pivotably mounted to the flat plate 86 of the vertical upright 42 (as has already been described), and the vertical upright 42 is inserted into the receptacle 82 of the mower deck bracket 46. As was also already described, the upper linkage shaft 32 is assembled through the upper ball joint 38, the compression spring 36, the locking collar 34 and onto the turnbuckle 30, which, in turn, is assembled to the lower linkage shaft 28 and, via the lower ball joint connection 68, is ultimately secured to the cam mounting mechanism 26 of the actuator arm 24. A first end of the tension spring 44 is hooked up to the anchor point 90 of the vertical upright 42, and a second end is hooked up to the shaft 72 of the upper ball joint 38. The lower limit stop 96 and the upper limit stop 106 are secured to the flat plate 86 of the vertical upright 42.

The discharge baffle assembly 14 is adjusted for smooth operation. The actuator arm 24 may be repositioned axially to its most advantageous position for operation. The connection point of the ball joint connection 68 to the cam mounting mechanism 26 may be selected to obtain the desired leverage. The turnbuckle 30 may be turned to adjust the overall length of the linkage assembly 28, 30, 32, and in combination with the adjustable lower limit stop 96, a proper length may be obtained to ensure that the plate 20 is fully closed against the discharge opening 50 in a first position of the handle 40 (See FIGS. 3A and 5A) and lies adjacent to the shroud 12 in the "open" position corresponding to a second position of the handle 40 (See FIGS. 3B and 5B). The baffle plate 20 normally will be stopped by the mower deck 48 before the handle 40 reaches the stop 96. The position of the locking collar 34 can also be adjusted to ensure that the spring 36 operates properly to allow the plate 20 to move to the fully open position of FIG. 5C and to hold the plate 20 in that position.

Operation: As the handle 40 is moved to its first position (See FIG. 5A), the tension spring 44 pulls down on the handle 40 so it rests firmly against the lower limit stop 96. The upper ball joint 38 keeps the compression spring 36 from moving up, essentially holding one end of the compression spring 36 immobile so that the other end of the compression spring 36 pushes on the locking collar 34, which, in turn, pushes down on the upper linkage shaft 32 (since the locking collar 34 is locked to the upper linkage shaft 32 via a set screw), and thus also pushes down on the balance of the discharge baffle assembly 14, to keep the baffle plate 20 in the tightly closed position against the discharge opening 50. The position of the locking collar 34 on the upper linkage shaft 32 may be adjusted, via the set screw, to control the amount of compression of the spring 36 and thus the force with which the plate 20 remains closed against the discharge opening 50.

When the handle 40 is rotated to its second position (See FIG. 5B), the tension spring 44 first stretches to allow the handle 40 to pivot about the bolt 103 and then pulls down on the handle 40 to "lock" it in place against the upper limit stop 106. In the process, the upper ball joint 38 rides up the upper linkage shaft 32 until it hits the hex head 70. It then pushes up against the hex head 70, raising the upper linkage shaft 32 and causing the plate 20 to pivot about the axis of the hinge 22 until it is in the "open" position, flush against the underside of the shroud 12 as shown in FIGS. 3B and 5B. The upper ball joint 38 keeps the hex head raised, thus keeping the entire linkage assembly raised (including parts 32, 30, 28, 24, and 20), so that the plate 20 remains open despite any bumps or jarring that may occur as the lawnmower 10 continues to be operated. The "open" position can be adjusted by adjusting the turnbuckle 30 to adjust the length of the linkage.

In some instances, as when loading the lawnmower 10 onto a trailer for transport, it may be desirable to fully raise or retract the discharge baffle assembly (as well as the shroud 12) to make the unit more compact and to protect the discharge baffle assembly from damage. This fully retracted position of the baffle assembly 14 is shown in FIG. 5C. The user first lifts the safety shroud 12 out of the way to the position shown in phantom in FIG. 2. The user may then also grab the nut 70 or the turnbuckle 30 or the baffle plate 20 to lift the linkage from the "open" position to the position shown in phantom at the top of FIG. 5C, shortening the effective length of the linkage, compressing the compression spring 36, and further rotating the baffle plate 20 to the fully open position shown in FIG. 5C. As the plate 20 pivots to its fully open position, the locking collar 34 pushes upwardly against the compression spring 36, further compressing this spring 36. Note that the plate 20 is rotating about an axis defined by the pin 108 of the hinge 22. When the plate 20 is in its normal open position shown in FIGS. 3A and 5A, the compression spring 36 is pushing downwardly on the linkage, with the plate 20 on the right side of the axis defined by the pin 108 of the hinge 22, opposing movement to further open the plate 20. This spring force must be overcome by the user to further open the plate 20. Once the plate 20 is in the fully raised position shown in FIG. 5C, the compression spring 36 is once again pushing downwardly against the locking collar 34, forcing the linkages 28, 32 down. However, since the location of the spring force pushing down on the linkages 28, 32 has now shifted to the left of the pivot axis defined by the pin 108 of the hinge 22, the spring force is now pushing to keep the plate 20 in the fully raised position shown in FIG. 5. The position of the locking collar 34 can be adjusted to ensure that the linkages have the correct amount of travel and to ensure that the spring 36 holds the plate 20 in the fully raised position. The handle 40 does not move as the plate 20 is manually rotated from the "open" position of FIGS. 3B and 5B to the fully raised or fully retracted position of FIG. 5C, but the position of the linkages 28, 32 changes relative to the handle 40.

Figure 7:
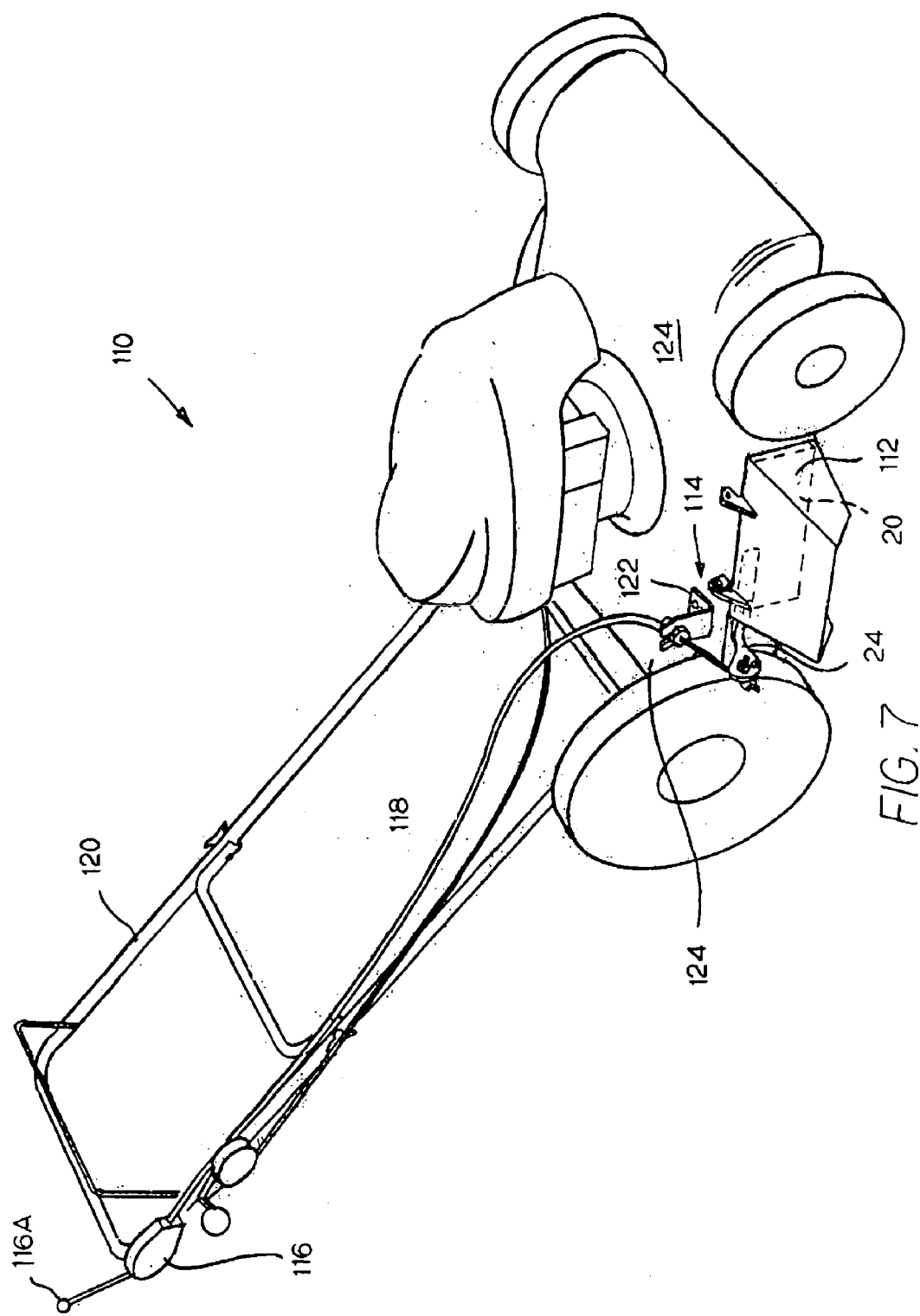
FIG. 7 shows an alternate embodiment of a discharge baffle assembly used in a typical walk-behind mower.

Second Embodiment:

FIG. 7 shows a walk-behind lawnmower 110 with a baffle discharge assembly 114 made in accordance with the present invention. This discharge assembly 114 has the same baffle plate 20, hinge 22, and actuator arm 24 with cam mounting mechanism 26 as the first embodiment 14. However, the linkages 28, 32 and handle 40 have been replaced by a cable type of control. A push & pull type remote cable control 116 is mounted to the handle bars 120 of the lawnmower 110, and a cable 118 extends from the control 116 to a forked mounting bracket 122 at the mower deck 124 which secures the jacket of the cable 118, such that the jacket is held immobile while the wire 124 inside the jacket is able to slide inside the jacket. This type of control mechanism is well known in the industry and is used for such purposes as accelerating, choking an engine, and shifting gears.

One end of the wire 124 is attached to the remote controller 116, and the second end of the wire 124 is attached to one of the openings 66 in the cam mounting mechanism 26. The remote controller 116 is preferably mounted so its handle 116A is readily accessible to the user walking behind the lawnmower 110.

To open the plate 20, the handle 116A is pulled, which pulls on the wire 124 of the cable 118, pulling the actuator arm 24 toward the deck mounting bracket 122, which opens the plate 20 to the position shown in FIG. 5B. If the shroud 112 is lifted up and the handle 116A is pulled further, the plate 20 will be fully retracted to the position shown in FIG. 5C. Pushing on the handle 116A rotates the plate 20 in the opposite direction, lowering it until it reaches the position shown in FIG. 5A. There may be sufficient friction in the cable 118 to keep the plate 20 in the desired position. If there is insufficient friction to keep the plate 20 in place, the remote controller 116 may be "locked" in place by any of several means known in the industry, such as by spring loading the handle 116A to fall into notches in its housing corresponding to the desired limit stops of the plate 20, or by clamping the wire 124 against the handle bars 120 or against the housing of the controller 116 when the desired position of the plate 20 has been reached.

Figure 8:
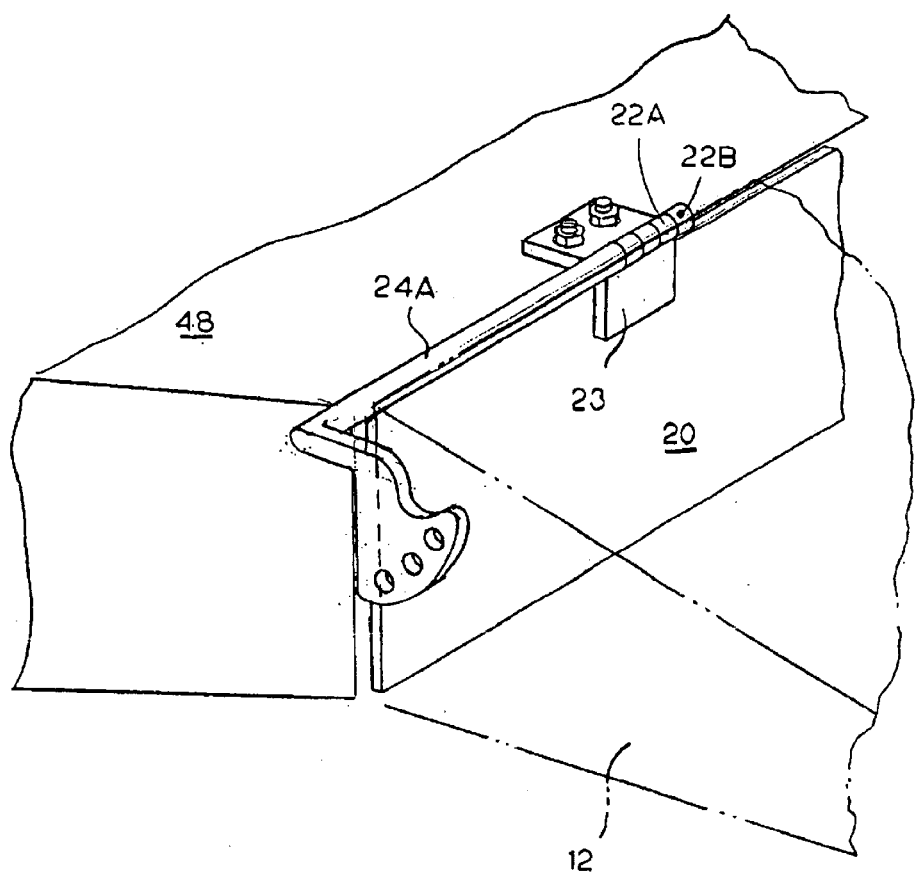
FIG. 8 shows another alternate embodiment of a discharge baffle assembly.
Figure 15:
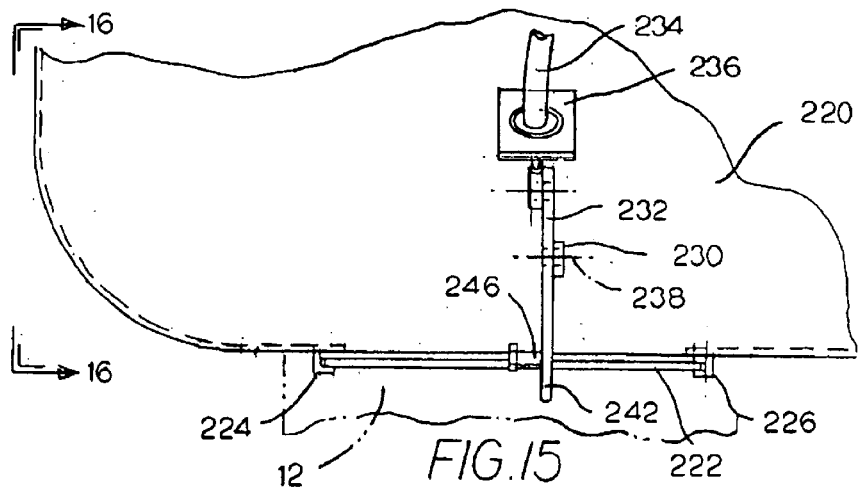
FIG. 15 is a broken away plan view of the mower deck and discharge baffle assembly of FIG. 14.

Third Embodiment:

FIG. 8 shows another alternative to the embodiment shown in FIGS. 1–6. This embodiment is identical to the first embodiment, except that the actuator arm 24 is an extension of the hinge pin for the hinge 22A. The hinge pin is secured to one of the knuckles of the hinge 22A which is part of the lower, movable portion 23 of the hinge 22A by means of a pin 22B, which extends through the knuckle and into the hinge pin. This lower, movable portion 23 is secured to the baffle plate 20. Thus, as the actuator arm 24A and the hinge pin projecting from the actuator arm 24A rotate, they cause the lower portion 23 of the hinge 22A to rotate, which, in turn, causes the baffle plate 20 to rotate. In this embodiment, the actuator arm 24A rotates about the same axis as the hinge 22A. This would reduce the size of any opening that would have to be cut in the shroud 12 for the actuator arm 24A.

Other Alternate Embodiments:

FIGS. 9–12 show another embodiment of a mower deck 200 including a discharge baffle 202 made in accordance with the present invention. As shown in FIG. 10, the baffle 202 is a segmented, sliding baffle, including a plurality of pivotably interconnected segments 202', similar to the cover of a roll-top desk. (The baffle 202 may alternatively be a single piece of flexible material.) As seen in FIGS. 11 and 12, this baffle 202 rides in upper and lower "C" channels 204, 206 respectively, extending along the side edge of the mower deck 200, and acting as a guide track. The flexible nature of the baffle 202 allows it to follow the curved contour 208 of the mower deck 200.

Any one of a number of means may be used to slide the baffle 202 to the closed position (as shown in FIG. 10), in which it closes the discharge opening 210, or to the open position (as shown in FIG. 9), in which it opens the discharge opening 210. For instance, a spring (not shown) or other biasing means may be installed to bias the baffle 202 towards a first (either open or closed) position. A cable (not shown, but similar to the cable arrangement 118 depicted in FIG. 7), a linkage, or other similar means, may be used to pull the baffle 202 toward a second (either closed or open) position in opposition to the biasing means.

For instance, if the spring (or other biasing means) urges the baffle 202 to the open position shown in FIG. 9, the operator-activated cable would be used to pull the baffle 202 across the discharge opening 210 (See FIG. 9), in opposition to the spring force, in order to move the baffle 202 to the closed position as shown in FIG. 10. By releasing the cable, the operator allows the biasing means (the spring) to pull the baffle 202 to the open position.

Figure 14:
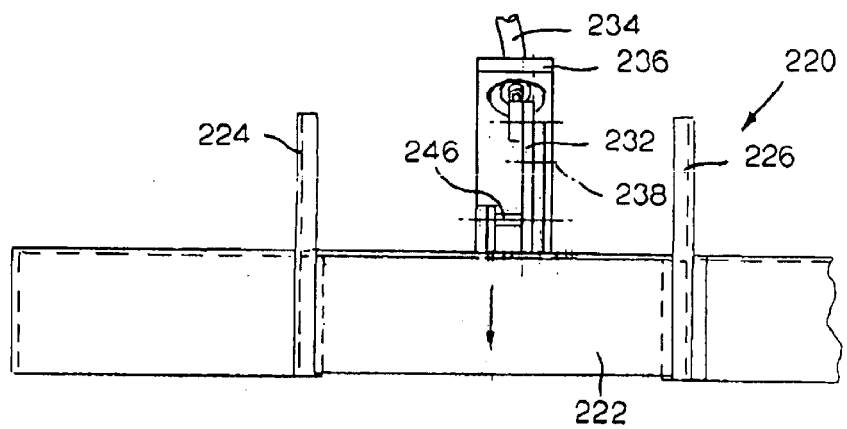
FIG. 14 is the same view as FIG. 13, but with the discharge baffle assembly in the closed position.
Figure 13:
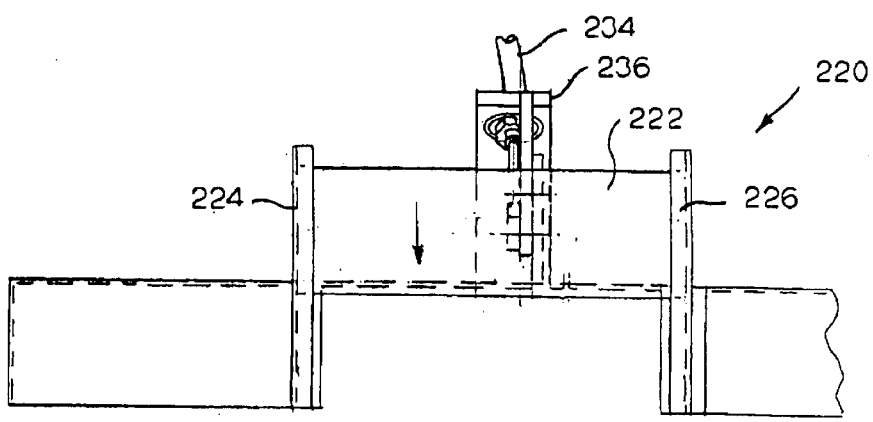
FIG. 13 is a broken away of another embodiment of a discharge baffle assembly made in accordance with the present invention, looking directly at the discharge opening, which is shown in the open position.

FIGS. 13–17 show another embodiment of a mower deck 220, including a discharge baffle 222 made in accordance with the present invention. In this case, there is a gap between the discharge hood and the deck or a slot in the discharge hood or the deck, which provides a space for the "guillotine" type of discharge baffle 222 to operate up and down. As shown in FIGS. 13 and 14, this embodiment includes a discharge baffle 222 with a guillotine action mechanism. Two upright channels 224, 226 provide a track for guiding the baffle 222 along its vertical motion.

Figure 16:
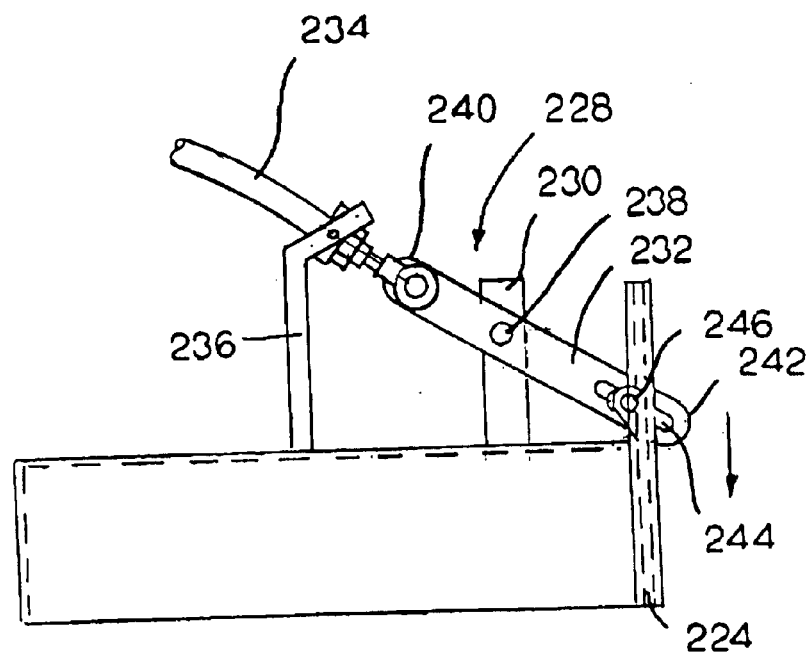
FIG. 16 is a view along line 16—16 of FIG. 15.
Figure 17:
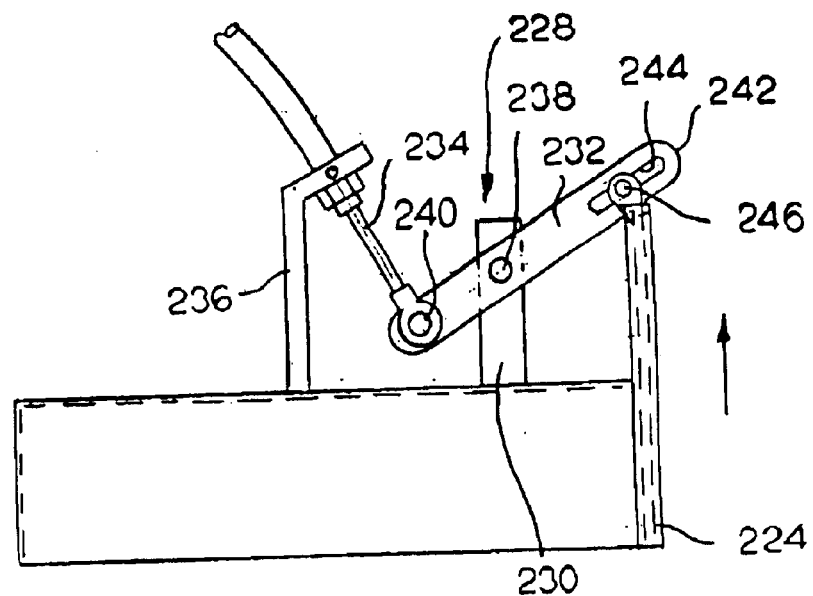
FIG. 17 is the same view as FIG. 16, but with the discharge baffle assembly in the open position.

FIGS. 16 and 17 best depict the seesaw mechanism 228 which is used to raise and lower the baffle 222. The seesaw mechanism 228 includes a fulcrum bracket 230, an actuator arm 232, an actuating cable 234, and a cable mounting bracket 236. The actuator arm 232 pivots about the pivot point 238 on the fulcrum bracket 230. A first end 240 of the actuator arm 232 is pivotably connected to the end of the cable 234, and a second end 242 of the actuator arm 232 is pivotably connected to the baffle 222 via a slotted opening 244 on the actuator arm 232 and a guide pin 246 (See FIG. 14) secured to the baffle 222.

As the operator pulls on the cable 234, he is also pulling up on the actuator arm 232 at its first end 240. The actuator arm 232 pivots about the pivot point 238, forcing the second end 242 of the actuator arm 232 to move downwardly, and thereby moving the guide pin 246 and the baffle 222 down to the closed position as depicted in FIGS. 14 and 16.

As the operator pushes on the cable 234, he also pushes down on the actuator arm 232 at its first end 240. Once again, the actuator arm 232 pivots about the pivot point 238, forcing the second end 242 of the actuator arm 232 to move upwardly, moving the guide pin 246 and the baffle 222 up to the open position shown in FIGS. 13 and 17.

As in previously described embodiments, alternative means for accomplishing the opening and closing action of this guillotine baffle design may be used without departing from the scope of this invention. For instance, a biasing means, such as a spring, could be used to urge the baffle 222 to a first position (such as the closed position shown in FIGS. 14 and 16). A cable, a foot operated pedal, or other alternate means could then be used to counter the biasing means in order to urge the baffle 222 to a second position (such as the open position shown in FIGS. 13 and 17).

Figure 18:
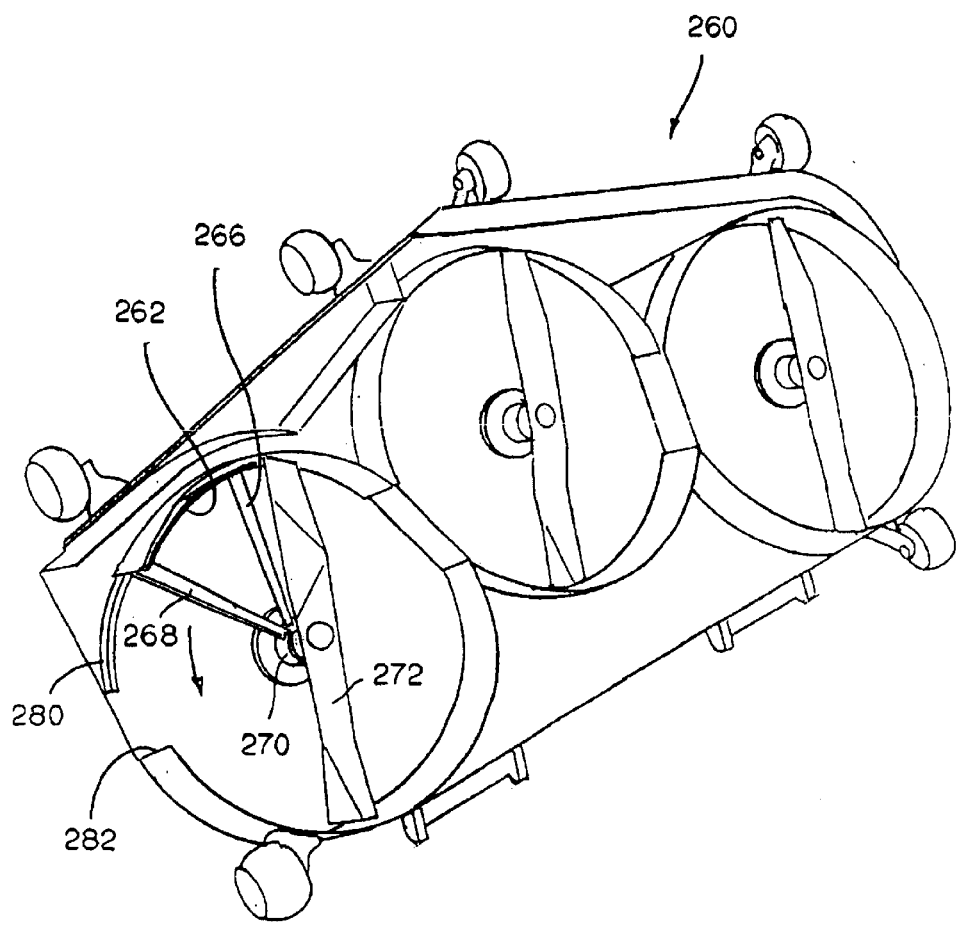
FIG. 18 is a perspective view of the underside of a mower deck showing another embodiment of a discharge baffle assembly made in accordance with the present invention, with the baffle in the open position.
Figure 19:
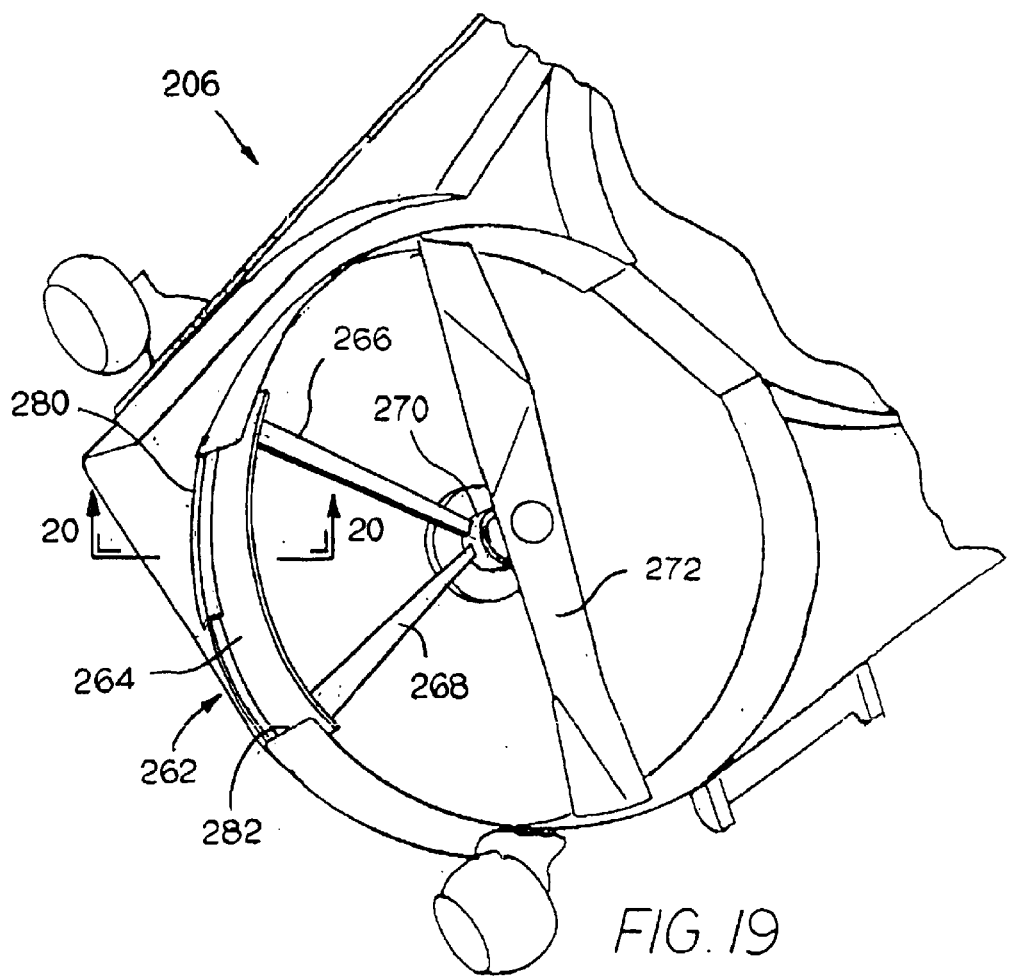
FIG. 19 is an enlarged, broken away view of the discharge baffle assembly of FIG. 18, but with the baffle in the closed position.
Figure 20:
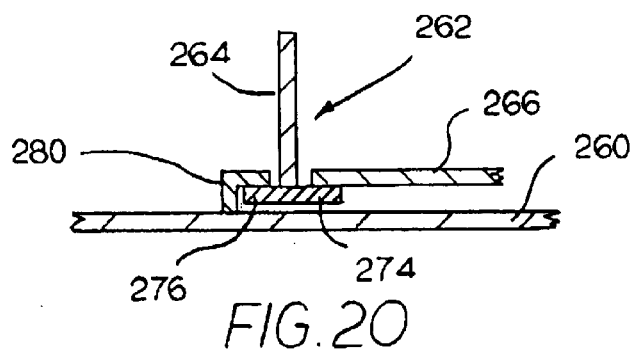
FIG. 20 is a view taken along line 20—20 of FIG. 19.

FIGS. 18–20 show another embodiment of a mower deck 260 including a discharge baffle 262 made in accordance with the present invention. The baffle 262 is a pie-segment-shaped element with an arcuate portion 264 and two arms 266, 268 rotatably connecting the arcuate portion 264 to the hub of one of the blades 272 via a collar 270.

FIG. 20 is a section through the baffle 262, showing the baffle 262 when it is in the inverted position. The arcuate portion 264 of the baffle 262 has a T-shaped profile, with the long vertical leg of the "T" being the arcuate portion 264 itself. A first horizontal leg 274 of the "T" is fixedly secured, as by welding, to the arms 266, 268, and a second horizontal leg extends outwardly and rides inside a channel 280 which is fixedly secured, as by welding, to the bottom surface of the mower deck 260. The channel 280 provides a guide and support structure for the baffle 262 to slide along the curved blade housing in order to open and close the discharge opening 282. FIG. 19 shows the baffle 262 slid to a closed position, and FIG. 18 shows the baffle 262 in the open position, in which it lies adjacent the inner surface of the blade housing.

As in previously described embodiments, several means for accomplishing the opening and closing action of this baffle design may be used without departing from the scope of the invention. For instance, a biasing means, such as a spring (not shown), could be used to urge the baffle 262 to a first position (such as the closed position shown in FIG. 19). A cable, a foot operated pedal, or other alternate means can be then be used to counter the biasing means in order to urge the baffle 262 to a second position (such as the open position shown in FIG. 18). The simplest way to operate this baffle 262 may be to control it at the central hub or collar 270. While the shroud is not shown in this embodiment, it is understood that the shroud that is normally on the mower deck can remain in place as the baffle 262 is being opened and closed.

Figure 21:
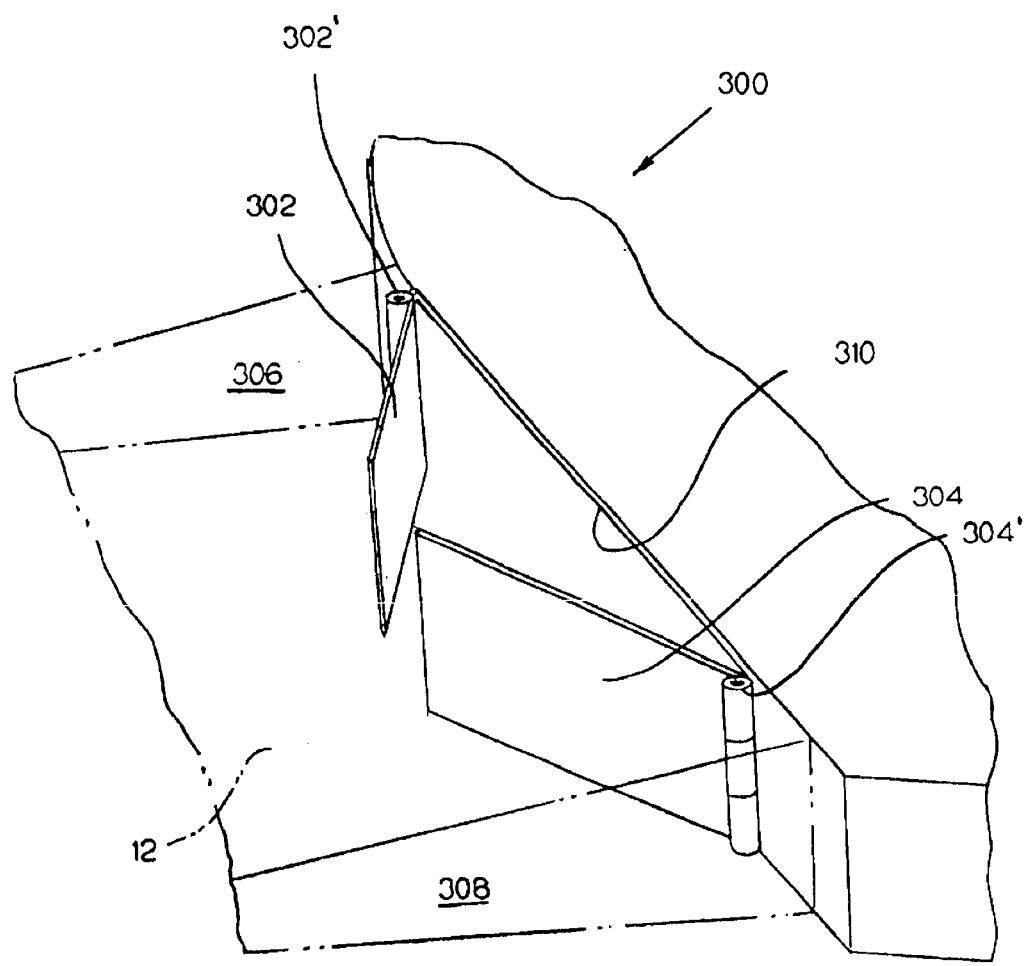
FIG. 21 is a perspective, broken away view of another embodiment of a discharge baffle assembly made in accordance with the present invention, shown in a partially open position, with the regular discharge shroud shown in phantom.

FIG. 21 shows another embodiment of a lawnmower deck 300 including a discharge baffle made up of two separately pivoting elements 302, 304 made in accordance with the present invention. The safety discharge hood 12 is shown in phantom in this figure. The baffles 302, 304 swing in or out about vertical axes represented by the hinge pins 302', 304' respectively. In the open position, the baffles 302, 304 are parallel to and flat against the side walls 306, 308 of the safety discharge hood 12. In the closed position, the baffles 302, 304 swing back to close the discharge opening 310 in the mower deck 300. A limit stop (not shown) may be installed to limit the swing of the baffles 302, 304 to ensure a tight closure of the discharge opening 310.

The actual opening and closing mechanism may be similar to that described with respect to the embodiment depicted in FIG. 8, wherein the hinge pins 302', 304' would extend upwardly to a height just above that of the mower deck 300, and rotation of the pins 302', 304' would also result in rotation of the baffles 302, 304 respectively.

It will be obvious to those skilled in the art that various modifications may be made to the embodiments described herein without departing from the scope of the present invention. For instance, many other known control mechanisms could be used to open and close the baffles, including, but not limited to, other mechanical, electrical, pneumatic, hydraulic, magnetic, or gravitational mechanisms.

What is claimed is:

1. A lawnmower, comprising:
   a deck defining a discharge opening having a top and left and right sides;
   a shroud extending outwardly from the deck and covering the discharge opening, said shroud including a top surface and left and right side surfaces which enclose the top and left and right sides of said discharge opening; and
   a baffle mounted for movement relative to said deck, wherein, in a first position, said baffle lies under said shroud and closes said discharge opening, and, in a second position, said baffle lies under said shroud and opens said discharge opening.

2. A lawnmower as recited in claim 1, wherein said baffle is mounted for pivoting movement relative to said deck, and further comprising means for pivoting said baffle between said first and second positions.

3. A lawnmower as recited in claim 2, wherein said means includes a cable.

4. A lawnmower as recited in claim 2, wherein said means includes a linkage.

5. A lawnmower as recited in claim 2, wherein said mower deck defines a footprint and said baffle has a third position, in which it is fully retracted and lies within said footprint.

6. A lawnmower as recited in claim 1, wherein said baffle is mounted for sliding movement relative to said deck.

7. A lawnmower as recited in claim 6, wherein said sliding movement is in a horizontal direction and said baffle is a flexible member which conforms to the shape of said deck when in the retracted position.

8. A lawnmower as recited in claim 6, wherein said sliding movement is in a vertical direction, and said baffle moves through a slot.

9. A lawnmower as recited in claim 6, wherein said sliding movement is in a horizontal direction and said baffle has an arcuate shape.

10. A lawnmower as recited in claim 9, wherein said baffle is suspended from said mower deck at a hub that is at a center point defined by said arcuate shape.

11. A lawnmower as recited in claim 2, wherein said pivot has a horizontal axis.

12. A lawnmower as recited in claim 2, wherein said pivot has a vertical axis.

13. A lawnmower as recited in claim 7, wherein said baffle is made of a plurality of interconnected segments.

14. A lawnmower as recited in claim 12, wherein said baffle has an arcuate shape and said pivot has an axis that lies along the center of a circle defined by said arcuate shape.

15. A lawnmower, comprising:
    a deck, defining a discharge opening and a deck footprint, said discharge opening having a top and left and right sides;
    a shroud, having a top surface and left and right side surfaces and mounted for movement relative to said deck from a raised position to a lowered position, wherein, in said lowered position, said shroud projects outwardly from said deck over said discharge opening and defines a shroud footprint, with the top surface and left and right side surfaces of the shroud enclosing the top and left and right sides of the discharge opening;

a baffle mounted on said deck and movable to a first position, closing said discharge opening and to a second position, opening said discharge opening, wherein said baffle is located within said deck and shroud footprints at all times as it moves between said first and second positions.

16. A lawnmower as recited in claim 15, wherein said baffle is a flat plate, and further comprising an actuator arm mounted on said baffle and projecting through said shroud.

17. A lawnmower as recited in claim 16, and further comprising control means for rotating said actuator arm to open and close said baffle.

18. A lawnmower as recited in claim 15, wherein said baffle pivots relative to said deck to open and close said discharge opening.

19. A lawnmower as recited in claim 18, wherein said baffle pivots about a horizontal pivot axis.

20. A lawnmower as recited in claim 18, wherein said baffle pivots about a vertical pivot axis.

21. A lawnmower as recited in claim 20, wherein said baffle has an arcuate shape and said pivot axis lies along the center of a circle defined by said arcuate shape.

22. A lawnmower as recited in claim 20, wherein said baffle includes two members, pivoting about parallel vertical pivot axes.

23. A lawnmower as recited in claim 15, wherein said baffle slides relative to said deck.

24. A lawnmower as recited in claim 23, wherein said baffle slides horizontally and said deck defines at least one horizontal track which supports said baffle.

25. A lawnmower as recited in claim 23, wherein said baffle slides vertically, and said deck defines parallel vertical tracks which guide said baffle.

26. A kit for a discharge baffle for a lawnmower, comprising:
   a baffle;
   a hinge;
   an actuator arm;
   a deck mounting bracket; and
   a control mechanism for causing said actuator arm to pivot about the hinge;
   wherein said deck mounting bracket defines a receptacle, and further comprising
   a shaft member receivable in said receptacle with a snug fit;
   a spring-biased linkage;
   a handle;
   a turnbuckle mountable on said linkage for adjusting the length of said linkage; and
   first and second ball joints.

27. A kit as recited in claim 26, wherein said actuator arm includes first and second ends, lying at substantially right angles to each other, and an elongated extension portion between said first and second ends, said first end having a top edge and a bottom edge; and said extension portion being substantially coplanar with said first end and having a bottom edge offset upwardly from the bottom edge of said first end.

28. A kit as recited in claim 26, and further comprising a plate defining an arcuate slot.

29. A kit as recited in claim 10, wherein said actuator arm is an extension of said hinge.

30. A lawnmower, comprising:
   a mower deck defining a deck footprint and a discharge opening;
   a shroud mounted for movement relative to said mower deck from a retracted position to an extended position in which said shroud projects from said mower deck over said discharge opening, said extended shroud defining a shroud footprint;
   a baffle plate under said shroud;
   a hinge pivotably mounting said baffle plate to said mower deck over said discharge opening; and
   an actuator arm for pivoting said baffle plate relative to said mower deck from a closed position to an open position while said baffle plate is under said shroud;
   wherein said baffle plate is located within said deck and shroud footprints at all intermediate positions as it moves from said closed position to said open position.

31. A lawnmower as recited in claim 30, wherein said actuator arm is mounted to said baffle plate.

32. A lawnmower as recited in claim 30, wherein said actuator arm is an extension of said hinge.

33. A lawnmower as recited in claim 2, wherein said baffle is a flat plate, and said pivoting movement is about a horizontal axis.

* * * * *